US011196483B2

(12) United States Patent
D'errico et al.

(10) Patent No.: US 11,196,483 B2
(45) Date of Patent: Dec. 7, 2021

(54) METHODS AND APPARATUS FOR MAINTENANCE IN AN OPTICAL COMMUNICATION NETWORK

(71) Applicant: Telefonaktiebolaget LM Ericsson (publ), Stockholm (SE)

(72) Inventors: Antonio D'errico, Calci (IT); Luca Giorgi, Ponsacco (IT); Marzio Puleri, Fiano Romano (IT); Veronica Tinucci, Leghorn (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/617,871

(22) PCT Filed: May 15, 2018

(86) PCT No.: PCT/EP2018/062492
§ 371 (c)(1),
(2) Date: Nov. 27, 2019

(87) PCT Pub. No.: WO2018/219633
PCT Pub. Date: Dec. 6, 2018

(65) Prior Publication Data
US 2020/0106522 A1 Apr. 2, 2020

Related U.S. Application Data

(60) Provisional application No. 62/512,785, filed on May 31, 2017.

(51) Int. Cl.
*H04B 10/079* (2013.01)
*H04Q 11/00* (2006.01)
(52) U.S. Cl.
CPC ..... *H04B 10/0793* (2013.01); *H04Q 11/0067* (2013.01); *H04Q 2011/0081* (2013.01); *H04Q 2011/0083* (2013.01)

(58) Field of Classification Search
None
See application file for complete search history.

(56) References Cited

U.S. PATENT DOCUMENTS 6,711,127 B1 * 3/2004 Gorman .............. H04L 63/1433
370/230
9,948,384 B1 * 4/2018 Morara ................. H04L 41/142
(Continued)

FOREIGN PATENT DOCUMENTS

CN 102118193 A * 7/2011
CN 102118193 B 9/2013

OTHER PUBLICATIONS

Abd Wahab, Mohd Helmy, "RFID-Based Equipment Monitoring System", Designing and Deploying RFID Applications; Universiti Tun Hussein Onn Malaysia, Jun. 2011, pp. 1-16.
(Continued)

*Primary Examiner* — David W Lambert
(74) *Attorney, Agent, or Firm* — Murphy, Bilak & Homiller, PLLC

(57) ABSTRACT

A method for monitoring a passive optical network, the passive optical network comprising a plurality of network components, comprises receiving an alert message (200) from a fault detection system associated with the passive optical network, the alert message comprising an indication of one or more candidate locations for a detected fault in the passive optical network. The method further comprises accessing an inventory (202) of the plurality of network components, the inventory storing, for each of the plurality of network components, information comprising the network component location. The method further comprises identifying (204), based on the one or more candidate locations and the network component locations, one or more
(Continued)

network components of the plurality of network components as candidates for the cause of the detected fault.

26 Claims, 4 Drawing Sheets

(56) References Cited

U.S. PATENT DOCUMENTS

| | | | | |
|---|---|---|---|---|
| 2009/0097846 A1* | 4/2009 | Kozischek | .......... | H04L 41/0677 |
| | | | | 398/20 |
| 2011/0026930 A1* | 2/2011 | Cui | ...................... | H04B 10/272 |
| | | | | 398/115 |
| 2012/0134673 A1* | 5/2012 | Palanisamy | .......... | H04B 10/271 |
| | | | | 398/58 |
| 2012/0224846 A1* | 9/2012 | Swanson | ................ | H04B 10/85 |
| | | | | 398/13 |

OTHER PUBLICATIONS

Unknown, Author, "FTTH Business Guide", Edition 5; FTTH Council Europe 2016, Feb. 16, 2016, pp. 1-97.

* cited by examiner

METHODS AND APPARATUS FOR MAINTENANCE IN AN OPTICAL COMMUNICATION NETWORK

TECHNICAL FIELD

Embodiments of the present disclosure relate to methods and apparatus in an optical network, and particularly to methods and apparatus for maintenance in an optical network.

BACKGROUND

The European Commission launched in 2010 the Digital Agenda, with ambitious target for 2020: 30 Mb/s available to all households with 50% subscription rate to offer 100 Mb/s minimum. This is expected to lead a high level of activity in building new network infrastructure. However, the targets are also likely to increase requirements for the control and maintenance of the network. A component that develops a fault will adversely impact network throughput, and should be repaired as soon as possible.

In current systems, however, the identification of faulty network components is not straightforward. For example, in passive optical networks, faults may be detected using optical time-domain reflectometers (OTDRs). OTDRs operate by injecting a series of optical pulses into the network (e.g. over an optic fibre) and extracting light which is scattered or reflected from points in the network. An OTDR may perform a test under correct operating conditions, and so extract reflection data which corresponds to correct operation of the network (or a relevant part of the network). Future tests may identify a fault when extracted light departs from this expected template. Further, the distance to the component causing the fault may be acquired by measuring the round-trip time of optical signals emitted by the OTDR and reflected from the faulty component.

Such a fault detection mechanism (and indeed other fault detection mechanisms) is known to the skilled person. However, one drawback associated with the mechanism is that it returns only a possible location (and possibly multiple locations) at which a faulty component may be located. It provides no information, beyond the approximate geographical location, as to the particular component which is causing the fault. Network engineers must therefore attend each of the possible locations until the faulty component is found. Further, they must take tools and equipment necessary to repair or replace a wide range of faulty components.

This can make the repair process prolonged and costly, which is detrimental to the functioning of the network as a whole.

SUMMARY

Embodiments of the disclosure provide methods, apparatus, non-transitory machine-readable mediums and computer program products that alleviate one of more of the problems identified above.

In one aspect, there is disclosed a method for monitoring a passive optical network. The passive optical network comprises a plurality of network components. The method comprises: receiving an alert message from a fault detection system associated with the passive optical network, the alert message comprising an indication of one or more candidate locations for a detected fault in the passive optical network; accessing an inventory of the plurality of network components, the inventory storing, for each of the plurality of network components, information comprising the network component location; and identifying, based on the one or more candidate locations and the network component locations, one or more network components of the plurality of network components as candidates for the cause of the detected fault.

The disclosure also includes systems, apparatus, such as a maintenance node or system, non-transitory machine-readable mediums, and computer program products for performing the method outlined above.

In a further aspect, there is disclosed a maintenance system for a passive optical network, the passive optical network comprising a plurality of network components. The maintenance system is configured to receive an alert message from a fault detection system associated with the passive optical network, the alert message comprising an indication of one or more candidate locations for a detected fault in the passive optical network; and access an inventory of the plurality of network components, the inventory storing, for each of the plurality of network components, information comprising the network component location. The system is configured to identify, based on the one or more candidate locations and the network component locations, one or more network components of the plurality of network components as candidates for the cause of the detected fault.

In a further aspect, there is disclosed a maintenance system for a passive optical network, the passive optical network comprising a plurality of network components, the maintenance system comprising processing circuitry and a non-transitory machine-readable medium storing code which, when executed by the processing circuitry, causes the maintenance system to receive an alert message from a fault detection system associated with the passive optical network, the alert message comprising an indication of one or more candidate locations for a detected fault in the passive optical network. The maintenance system is further caused to access an inventory of the plurality of network components, the inventory storing, for each of the plurality of network components, information comprising the network component location; and identify, based on the one or more candidate locations and the network component locations, one or more network components of the plurality of network components as candidates for the cause of the detected fault.

In a further aspect, there is disclosed a maintenance system for a passive optical network, the passive optical network comprising a plurality of network components, the maintenance system comprising a first module configured to receive an alert message from a fault detection system associated with the passive optical network, the alert message comprising an indication of one or more candidate locations for a detected fault in the passive optical network; and a second module configured to access an inventory of the plurality of network components, the inventory storing, for each of the plurality of network components, information comprising the network component location. The maintenance system further comprises a third module configured to identify, based on the one or more candidate locations and the network component locations, one or more network components of the plurality of network components as candidates for the cause of the detected fault.

In a further aspect, there is disclosed a system associated with a passive optical network, the passive optical network comprising a plurality of network components, the system comprising: a maintenance system according to any example; a fault detection system, coupled to the passive optical network, and configured to provide the alert message comprising an indication of one or more candidate locations for a detected fault in the passive optical network; and an inventory comprising information for one or more of the network components.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
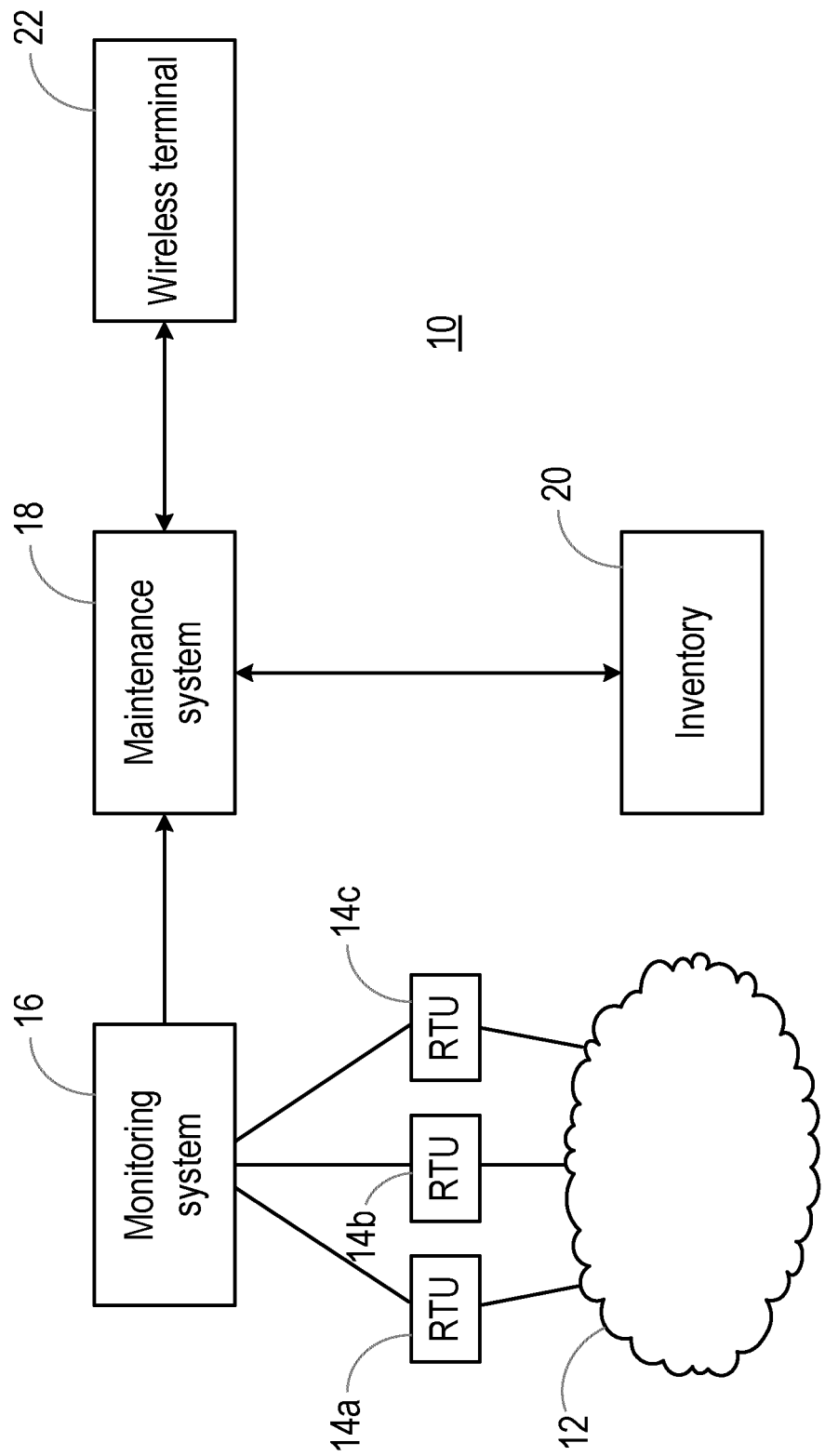
FIG. 1 shows a system according to embodiments of the disclosure.

FIG. 1 shows a system 10 that may be utilized to explain the principles of embodiments of the present disclosure.

The system 10 comprises an optical network 12, which may be a passive optical network, and which comprises a plurality of network components (not illustrated). The network components may comprise one or more of: optical light sources (such as lasers or LEDs); multiplexers/demultiplexers (such as optical add/drop multiplexers (OADMs) and reconfigurable optical add/drop multiplexer (ROADMs)); optical switches; optical splitters; circulators; optical amplifiers; and optical fibres.

Coupled to the optical network 12 are a plurality of remote terminal units (RTUs) 14a, 14b, 14c (collectively, 14), which provide an interface between the network 12 and a network monitoring system 16. Each RTU 14 may be operable under the control of the monitoring system 16 to transmit test signals to identify a fault. For example, the RTUs 14 may be configured to transmit optical pulses into the network 12 (or respective portions of the network). The RTUs 14 are configured to measure the test signals (or reflections and back-scattered signals as a result of the test signals) and provide data concerning the network to the monitoring system 16.

The system 10 further comprises a maintenance system 18, operatively coupled to the monitoring system 16; an inventory 20; and a wireless terminal 22.

As noted above, the RTUs 14 may provide an interface between the optical network 12 and the monitoring system 16. For example, each RTU 14 may comprise an optical time-domain reflectometer (OTDR), operable to transmit one or more optical pulses into the network 12, or respective parts thereof, under control of the monitoring system 16, and to detect reflected signals as a result of the transmitted optical pulses. For example, an OTDR may be controlled to transmit an optical pulse and to monitor the transmission medium for a period of time after the optical pulse transmission. The signal which is detected in this period of time may be provided to the monitoring system 16 for further analysis or, alternatively, the signal may be analysed in the respective OTDR, and the analysis provided to the monitoring system 16.

In one embodiment, the monitoring system 16 or, alternatively, the RTUs 14 compares the detected signal to one or more templates. For example, the RTUs 14 may be operable to carry out one or more test measurements when the network is functioning correctly, so as to measure the reflected signals (i.e. in the frequency and/or time domains) and obtain a template signal corresponding to correct functioning of the network. Multiple such templates may be acquired for different configurations of the network 12 (i.e. different switching configurations, etc). In future tests, the obtained signals may be compared to such a template, or templates, to determine if the network is functioning correctly.

If the network 12 is not functioning correctly, this is likely because one or more of the network components in the path which is tested by the RTU 14 has developed a fault. Such a fault may be detected by a change in the reflected signal, compared to one or more of the templates. For example, a signal may be reflected or scattered from the faulty component, which would not ordinarily be so reflected or scattered if the component was functioning correctly. By measuring the round trip time between transmission of the optical pulse by the OTDR and detection of the anomalous reflected signal, the distance between the OTDR and the faulty component can be determined.

The inventory 20 comprises information for one or more network components in the network 12. In one embodiment, the inventory 20 comprises information for each of the components in the network 12. In some aspects, the inventory may be considered as a memory or memory circuitry comprising information, e.g. functioning as a database.

According to embodiments of the disclosure, the inventory 20 comprises at least the location (e.g. the geographical location) for the network components. The inventory may comprise an identity of the network component and a geographical location associated with that network component identity.

In further embodiments of the disclosure, the inventory 20 comprises the network component type, i.e., optical light source; multiplexer/demultiplexer; optical switch; optical splitter; circulator; optical amplifier; and optical fibre. The network component type may comprise further detail, such as the nature of the optical light source (e.g., LED or laser) or the mux/demux (e.g., OADM or ROADM); the manufacturer of the component; the model or make of the component; and the serial number of the component.

In yet further embodiments of the disclosure, the inventory 20 comprises the current status of the network components. Alternatively or additionally, the status of each network component may be maintained in a look-up table stored in the maintenance system 18 (see below). A wide range of different statuses may be defined without departing from the scope of the statements appended hereto, and the disclosure is in general not limited to any particular statuses. In one embodiment, however, and as described in further detail below, the status may be selected from a group indicating the status as: operational; upgraded; and candidate for fault.

The information contained in the inventory 20 may be updated based on machine-readable identifiers associated with the components (e.g. mounted, or affixed directly to the component). Examples of suitable machine-readable identifiers include: RFID tags; barcodes; QR codes; and digital watermarking. For example, the inventory 20 may be populated with information for a particular network component when first installed in the network 12, based on data contained within the machine-readable identifier. Thus, an engineer may install the component and interact with the machine-readable identifier with a suitable electronic reader device. The reading of the machine-readable identifier may be considered as an interaction with the machine-readable identifier. The information so obtained may be used automatically to populate and/or update the information contained in the inventory 20. For example, the information may be transmitted from the electronic reader device, e.g. through a radio access network, to a receiver connected to the inventory.

According to embodiments of the disclosure, the system 10 further comprises a maintenance system 18, which is communicatively coupled to at least the monitoring system 16 and the inventory 20. In communicating with both the monitoring system 16 and the inventory 20, the maintenance system 18 is operable to identify candidate network components, as well as network component types, that may have caused a fault. That is, the maintenance system 18 may receive an indication of a fault from the monitoring system. The indication may comprise an indication of the geographical location of the fault (or several possible locations), such as the geographical location itself, or a distance between the monitoring system 16 and the fault (as may be provided by an OTDR, for example). The maintenance system 18 is operable to correlate the indication from the monitoring system 16 with information in the inventory 20, and so identify one or more candidate network components that may have caused the fault. For example, the maintenance system 18 may determine one or more network components that are located at the location of the fault. The maintenance system 18 may comprise one or more processors (processing circuitry) in order to identify the candidate network component(s) included in the inventory that may have caused the fault identified by the monitoring system 16. See also FIGS. 4 and 5, below.

A list of the candidate faulty components may be output by the maintenance system 18 to a wireless device, also termed a wireless terminal 22. The wireless terminal 22 may be associated with an engineer or engineering team. The communication between the wireless terminal 22 and the maintenance system 18 may be by radio communication using any suitable radio access technology. The terminal 22 may implement a dedicated application showing the candidate faulty components as well as data associated therewith (such as the data associated with each network component in the inventory 20). In some examples, the machine-readable identifier is read by the wireless terminal 22 functioning as the electronic reader device, e.g. using a camera of the wireless terminal to read a QR code. In another example, the electronic reader device is connected to the wireless terminal 22, e.g. by an electrical wire. In a further example, the electronic reader device and wireless terminal 22 are separate.

The status of each network component (either stored in the inventory 20, as described above, or in a look-up table stored in the maintenance system 18) may thus be updated by the maintenance system. Upon identifying a particular network component as a candidate for the fault, the status of the network component in the look-up table or and/or the inventory 20 may be updated to reflect that status. The status may also be updated based on input received from the wireless terminal 22, i.e. from the engineer or engineering team. For example, when the network component is installed, the status may be set to "upgraded", to indicate that the component is new. After a period of time of correct operation, the status may be automatically changed to "operational". The maintenance system 18 may implement a finite-state machine in order to control and administer the status changes for each network component.

According to further embodiments of the disclosure, the maintenance system 18 is configured to perform statistical analysis of the data contained within the inventory 20, and also data concerning faults received from the monitoring system 16. For example, the maintenance system 18 may carry out one or more analytic algorithms, to determine one or more network locations, network component types, manufacturers, manufacture batches, models, etc that are associated with a higher frequency of faults than average. For example, the maintenance system 18 may determine a parameter such as the mean time between faults (MTBF) for one or more of: network locations, network component types, manufacturers, manufacture batches, models. The identification of candidate faulty network components may further be based on such statistical analysis.

For example, consider the scenario whereby two possible candidate geographical locations have been identified for the fault by the monitoring system 16, and the maintenance system 18 determines that a first location of the two candidate geographical locations is associated with a higher frequency of faults than the second. In that case, the maintenance system 18 may identify one or more network components at the first location instead of the second as candidates for the fault, or prioritize an investigation of network components at the first location over those at the second location.

Similarly, consider the scenario whereby two network components of different first and second types are identified as being located at potential geographical locations of the fault, and the maintenance system 18 determines from previous statistical analysis that the first type of network component generally experiences a higher frequency of faults and failures than the second type of network component. In that case, the maintenance system 18 may identify the network component of the first type instead of the component of the second type as a candidate for the fault, or prioritize an investigation of the network component of the first type over the component of the second type.

Those skilled in the art will appreciate that this type of analysis may be extended to other parameters describing the network components. In general, the maintenance system 18 may utilize such statistical analysis to identify candidate faulty components and/or to prioritize candidate faulty components for further investigation by the engineer or engineering team. In the latter case, the list of candidate faulty network components may be ordered by priority, with those network components most likely to be the cause of the fault at the top of the list, and those components less likely towards the bottom of the list.

In the event that a particular network component type, manufacturer, location, etc is associated with a particularly high fault frequency (e.g. above a threshold), the maintenance system 18 may generate an alert message identifying the problem, so that appropriate action can be taken by a user of the system 10.

In some examples the maintenance system 18 is a separate system from the monitoring system 16. Thus, an indication of one or more candidate locations for the fault may be transmitted to a different site or at least a different system. In some examples, the inventory 20 may be integrated with, or separate to, the maintenance system 18.

In some aspects, the system 10 may be considered as two connected parts. The monitoring system 16 may be considered as associated with, or a part of, the passive optical network 12 having network components. The monitoring system 16 is configured to output an indication of a location of a fault, e.g. as a fault location, e.g. site or area, or as a distance from a particular point, e.g. a distance from an RTU 14. As a separate part of the system, a memory storing inventory information contains information about the network components of the passive optical network 12, e.g. location, type and/or status of the network components. The inventory 20 receives input using machine readable identifiers on the network components. For example, a wireless terminal may be used to read the machine readable identifier and transmit the location, type and/or status information to be stored in the inventory. The maintenance system 18 is configured to combine the two inputs, i.e. the fault from the PON 12 and the network component information from the inventory 20, and output an identified network component(s) which is determined to be at fault (or which may be at fault). For example, the exact location and type of network component may be output using the inventory information, based on the approximate location information provided by the PON monitoring system.

Figure 2:
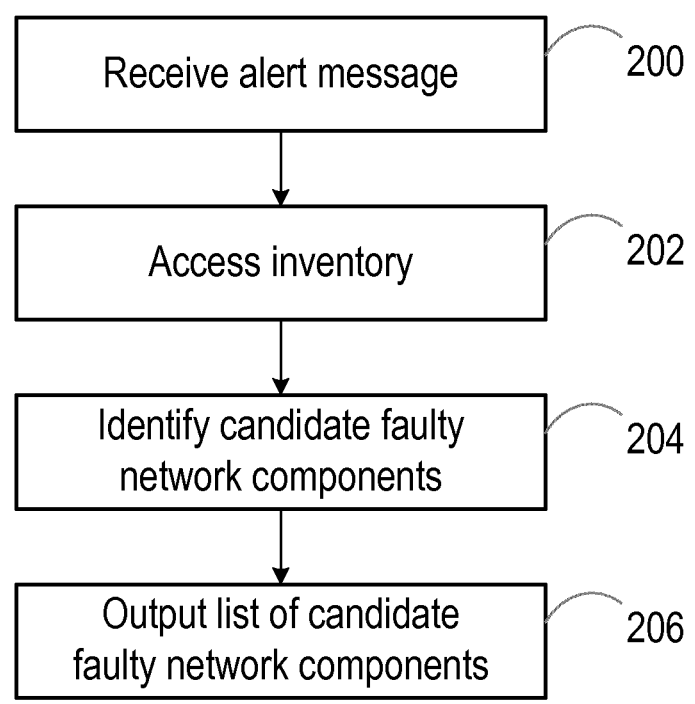
FIG. 2 shows a method in a maintenance system or node according to embodiments of the disclosure.

FIG. 2 is a flowchart of a method according to embodiments of the disclosure. The method may be carried out in a maintenance system for a passive optical network, such as the maintenance system 18 described above.

The method begins in step 200, in which an alert message is received from a fault detection system associated with the passive optical network, e.g. the monitoring system 16 described above. The alert message identifies the presence of a fault in the network (e.g. through the monitoring of reflected and back-scattered signals), and may also comprise an indication of one or more candidate locations for the fault. The latter information may comprise, or be based on, a distance between the fault detection system and the fault (such as may be obtained by an OTDR).

In step 202, the maintenance system accesses an inventory (such as the inventory 20), which stores information for one or more, or all, of the network components in the passive optical network. The inventory may comprise at least the location (e.g. the geographical location) for the network components. Thus the inventory may comprise an identity of the network component and a geographical location associated with that network component identity. In further embodiments of the disclosure, the inventory may also comprise the network component type and the current status of the network components.

In step 204, the maintenance system identifies, on the basis of at least the candidate locations for the fault and the information contained in the inventory, one or more candidate network components as the source of the fault. For example, the maintenance system may correlate the candidate locations with the geographical locations of network components in the inventory, and so identify one or more candidate network components that may have caused the fault. For example, the maintenance system may determine one or more network components that are located at the candidate locations.

Step 204 may further comprise identifying the candidate network components on the basis of statistical analysis of data contained within the inventory. For example, the maintenance system may carry out one or more analytic algorithms, to determine one or more network locations, network component types, manufacturers, manufacture batches, models, etc that are associated with a higher frequency of faults than average. For example, the maintenance system 18 may determine a parameter such as the mean time between faults (MTBF) for one or more of: network locations, network component types, manufacturers, manufacture batches, models. The identification of candidate faulty network components may further be based on such statistical analysis.

In step 206, the maintenance system outputs a list of candidate faulty network components. The list may be transmitted to a wireless terminal (e.g. a UE, or other wireless device) associated with an engineer or an engineering team. Alternatively, the list may be transmitted to a server associated with an engineering team or department, and further output, e.g. by printing. The list of candidate faulty network components may be arranged in a prioritized order, based on statistical analysis referred to in step 204, to list those components most likely to be the source of the fault at the top.

Figure 3:
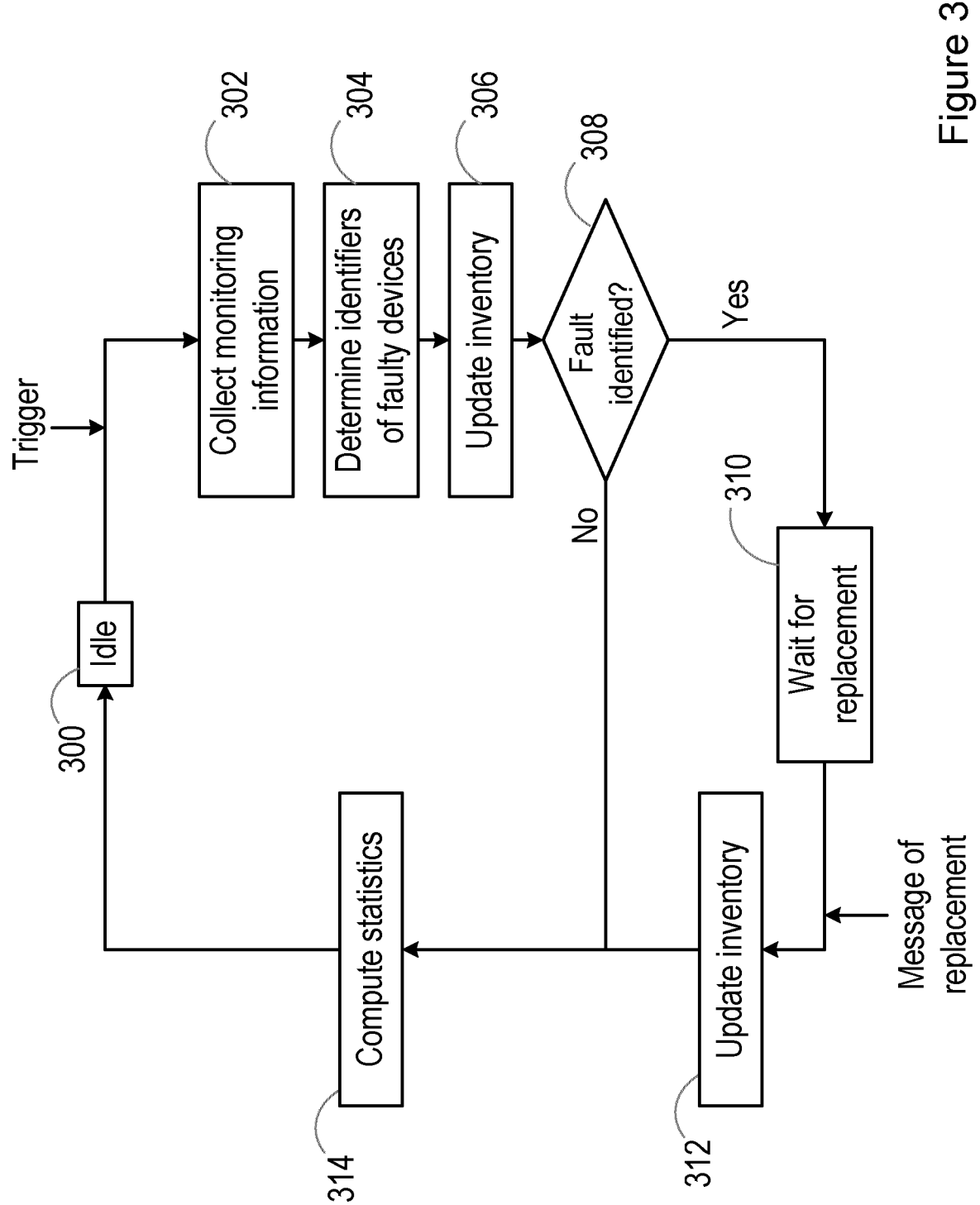
FIG. 3 shows a method in a system or node according to embodiments of the disclosure.

FIG. 3 is a flowchart of another method according to embodiments of the disclosure. The method may be carried out within the system 10 described above with respect to FIG. 1, as follows.

The system is initially idle, in step 300, when a trigger event is detected. For example, the fault detection system or monitoring system 16 may detect a possible fault in the network 12, through detection of anomalous reflected or scattered optical signals in an OTDR.

In step 302, the maintenance system 18 collects monitoring information (when possible considering actual traffic) of the network 12. Monitoring information can additionally or alternatively be acquired periodically. For example, the monitoring information may be received from the monitoring system 16, and comprise an indication of a location (or one or more candidate locations) of a detected fault in the network 12.

In step 304, the maintenance system 18 determines identifiers of one or more network components as candidates for the fault. For example, the fault detection system may provide one or more geographical locations for the fault, as indicated above. The maintenance system 18 may therefore identify one or more candidate network components as the source of the fault on the basis of at least the candidate locations for the fault and the information contained in the inventory 20. The maintenance system may also identify candidate network components on the basis of statistical analysis of data contained within the inventory, as described above. A list of the candidate network components is provided to an engineer or engineering team.

In step 306, the maintenance system 18 updates the inventory and/or the look-up table with the new operational status of each of the identified candidate network components (e.g., to "candidate for fault").

In step 308, the maintenance system 18 determines whether a fault was actually identified with any of the candidate network components (i.e. by the engineer). For example, upon physical inspection of the candidate network components, the engineer may determine that one or more, or all of the candidate network components is functioning correctly. For example, the engineer may utilize a wireless terminal to input the relevant information to the maintenance system 18 or the inventory 20 directly, for example, through interaction with the machine-readable identifier associated with each network component that undergoes inspection. In that case, the method moves to step 312 and the inventory (or look-up table) is updated for each so-identified network component to indicate the component as functional. In step 314, one or more statistical algorithms may be carried out on the new data in the inventory, to update previous statistical analyses, and the method returns to the idle state.

If one or more network components is identified as faulty (e.g. through a signal received from the wireless terminal 22, for example, from an input by the engineer, or any other suitable mechanism), the method moves to step 310 in which a replacement network component must be found and fitted to the network 12. Upon replacement, a message is received and the method moves to step 312 again, in which the status of the network component is changed to "upgraded".

Figure 4:
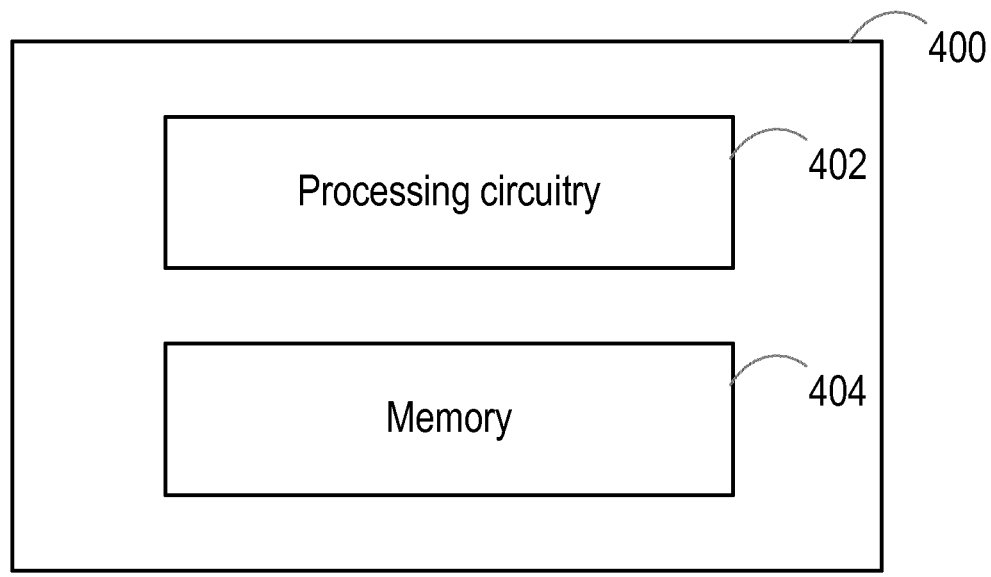
FIG. 4 shows a maintenance system or node according to embodiments of the disclosure.

FIG. 4 is a schematic diagram of a maintenance system 400 for a passive optical network according to embodiments of the disclosure. The maintenance system 400 may be suitable to perform the method shown in FIG. 2, for example, and may correspond to maintenance system 18 shown and described above with respect to FIG. 1.

The maintenance system 400 is operable with a passive optical network comprising a plurality of network components.

The maintenance system 400 comprises processing circuitry 402 and a non-transitory machine-readable medium 404 (such as memory) which is coupled to the processing circuitry 402. The machine-readable medium 404, or memory, may be any type of medium, e.g. a hard disc drive, solid state memory, Random Access Memory, located in one or more locations. The machine-readable medium 404 comprises instructions which, when executed by the processing circuitry 402 cause the maintenance system 400 to: receive an alert message from a fault detection system associated with the passive optical network, the alert message comprising an indication of one or more candidate locations for a detected fault in the passive optical network; access an inventory of the plurality of network components, the inventory storing, for each of the plurality of network components, information comprising the network component location; and identify, based on the one or more candidate locations and the network component locations, one or more network components of the plurality of network components as candidates for the cause of the detected fault.

The maintenance system 400 may also generally comprise interface hardware and/or software for transmitting and receiving signals, either via one or more wires or optical fibres, or wirelessly.

Figure 5:
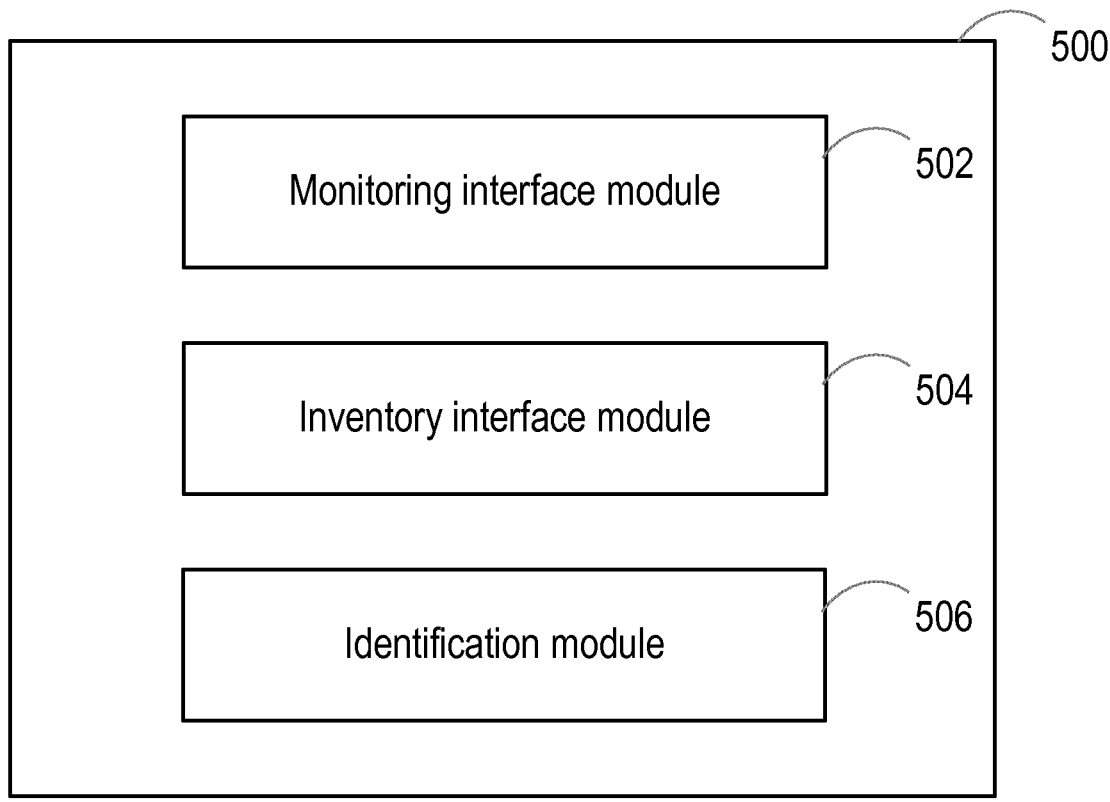
FIG. 5 shows a maintenance system or node according to further embodiments of the disclosure.

FIG. 5 is a schematic diagram of a maintenance system 500 according to embodiments of the disclosure. The maintenance system 500 may be suitable to perform the method shown in and described with respect to FIG. 2, for example, and may correspond to the maintenance system 18 shown and described above with respect to FIG. 1.

The maintenance system 500 is operable with a passive optical network comprising a plurality of network components.

The maintenance system 500 comprises a monitoring interface module 502, which is operable to receive an alert message from a fault detection system associated with the passive optical network, the alert message comprising an indication of one or more candidate locations for a detected fault in the passive optical network. The maintenance system 500 comprises an inventory interface module 504 operable to access an inventory of the plurality of network components, the inventory storing, for each of the plurality of network components, information comprising the network component location. The maintenance system 500 further comprises an identification module 506 configured to identify, based on the one or more candidate locations and the network component locations, one or more network components of the plurality of network components as candidates for the cause of the detected fault.

The maintenance system 500 may also generally comprise interface hardware and/or software for transmitting and receiving signals, either via one or more wires or optical fibres, or wirelessly.

Thus embodiments of the disclosure provide methods, apparatus, systems, non-transitory computer-readable mediums, and computer program products that help to identify network components as candidates for a fault within a passive optical network. Information may be acquired through the use of smart-tags, or other machine-readable identifiers associated with network components, and correlated with monitoring information received from a fault detection system. Candidate faulty components can thus be identified, and moreover the type of candidate faulty component identified, to enable faster, more effective maintenance of the network.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method for monitoring a passive optical network, the passive optical network comprising a plurality of network components, the method comprising:

receiving an alert message from a fault detection system associated with the passive optical network, the alert message comprising an indication of one or more candidate locations for a detected fault in the passive optical network;

accessing an inventory of the plurality of network components, the inventory storing, for each of the plurality of network components, information comprising a network component location; and identifying, based on the one or more candidate locations and the network component locations, one or more network components of the plurality of network components as candidates for a cause of the detected fault.

2. The method of claim 1, wherein the indication of one or more candidate locations of the detected fault comprises a distance between the fault detection system and the detected fault.

3. The method of claim 1, wherein the indication of one or more candidate locations of the detected fault comprises one or more candidate locations of the detected fault based on a distance between the fault detection system and the detected fault.

4. The method of claim 1, further comprising:
outputting a list of the one or more candidate network components.

5. The method of claim 4, wherein the information further comprises a network component type, and wherein the list further identifies a network component type of the one or more candidate network components.

6. The method of claim 4, wherein outputting the list comprises transmitting the list to a wireless terminal.

7. The method of claim 1, wherein the inventory is updated with information for a particular network component upon interaction with a machine-readable identifier associated with the particular network component.

8. The method of claim 7, wherein the machine-readable identifier comprises one or more of: a QR code, a barcode, a radio frequency identification tag, RFID, and digital watermarking.

9. The method of claim 1, wherein the information further comprises an indication of a status of the network component.

10. The method of claim 9, wherein the status is updated based on input from one or more of: a monitoring system and an engineer.

11. The method of claim 9, wherein the status is selected from a group comprising: operational, upgraded, and candidate for fault.

12. The method of claim 11, wherein the status for a network component is set to upgraded upon installation of the network component in the passive optical network.

13. The method of claim 12, wherein the status for a network component is updated from upgraded to operational, upon successful operation for at least a threshold period of time.

14. The method of claim 1, wherein the identification of one or more network components of the plurality of network components as candidates for the cause of the detected fault is further based on statistical analysis of the information stored in the inventory.

15. The method of claim 14, wherein the statistical analysis identifies one or more of:
one or more locations in the passive optical network at which faults are detected with greater than average frequency; and
one or more network component types that generate faults with greater than average frequency.

16. A maintenance system for a passive optical network, the passive optical network comprising a plurality of network components, the maintenance system comprising processing circuitry and a non-transitory machine-readable medium storing code which, when executed by the processing circuitry, causes the maintenance system to:

receive an alert message from a fault detection system associated with the passive optical network, the alert message comprising an indication of one or more candidate locations for a detected fault in the passive optical network;

access an inventory of the plurality of network components, the inventory storing, for each of the plurality of network components, information comprising a network component location; and identify, based on the one or more candidate locations and the network component locations, one or more network components of the plurality of network components as candidates for a cause of the detected fault.

17. The maintenance system of claim 16, wherein the indication of one or more candidate locations of the detected fault comprises a distance between the fault detection system and the detected fault, or, wherein the indication of one or more candidate locations of the detected fault comprises one or more candidate locations of the detected fault based on a distance between the fault detection system and the detected fault.

18. The maintenance system of claim 16, wherein the machine-readable medium further stores instructions which, when executed by the processing circuitry, cause the maintenance system to:
output a list of the one or more candidate network components.

19. The maintenance system of claim 18, wherein the information further comprises a network component type, and wherein the list further identifies a network component type of the one or more candidate network components.

20. The maintenance system of claim 18, wherein the maintenance system is configured to output the list by transmitting the list to a wireless terminal.

21. The maintenance system of claim 16, wherein the inventory is updated with information for a particular network component upon interaction with a machine-readable identifier associated with the particular network component.

22. The maintenance system of claim 21, wherein the machine-readable identifier comprises one or more of: a QR code, a barcode, a radio frequency identification tag, RFID, and digital watermarking.

23. The maintenance system of claim 16, wherein the information further comprises an indication of a status of the network component.

24. The maintenance system of claim 16, wherein a status for a network component is updated from upgraded to operational, upon successful operation for at least a threshold period of time.

25. The maintenance system of claim 16, wherein the identification of one or more network components of the plurality of network components as candidates for the cause of the detected fault is further based on statistical analysis of the information stored in the inventory.

26. The maintenance system of claim 25, wherein the statistical analysis identifies one or more of:
one or more locations in the passive optical network at which faults are detected with greater than average frequency; and one or more network component types that generate faults with greater than average frequency.

* * * * *